United States Patent [19]
Johnson

[11] Patent Number: 5,805,788
[45] Date of Patent: Sep. 8, 1998

[54] RAID-5 PARITY GENERATION AND DATA RECONSTRUCTION

[75] Inventor: Timothy J. Johnson, Eau Claire, Wis.

[73] Assignee: Cray Research, Inc., Eagan, Minn.

[21] Appl. No.: 650,336

[22] Filed: May 20, 1996

[51] Int. Cl.$^6$ .................................................. G06F 11/00
[52] U.S. Cl. .................................. 395/182.04; 371/49.2; 395/441
[58] Field of Search .................... 395/182.04, 182.03, 395/182.18, 441; 371/49.1, 49.2, 2.2, 21.1, 40.1, 50.1

[56] References Cited

U.S. PATENT DOCUMENTS

| | | | |
|---|---|---|---|
| 5,195,100 | 3/1993 | Katz | 395/182.04 X |
| 5,233,618 | 8/1993 | Glider | 371/68.1 |
| 5,274,799 | 12/1993 | Brant | 395/182.04 |
| 5,303,244 | 4/1994 | Watson | 371/10.1 |
| 5,345,565 | 9/1994 | Jibbe | 395/325 |
| 5,402,428 | 3/1995 | Kakuta | 395/182.04 X |
| 5,452,444 | 9/1995 | Solomon | 395/182.04 |
| 5,499,337 | 3/1996 | Gordon | 395/182.04 |
| 5,513,192 | 4/1996 | Janku | 371/50.1 |
| 5,519,844 | 5/1996 | Stallmo | 395/441 |
| 5,522,031 | 5/1996 | Ellis | 395/182.04 |
| 5,530,948 | 6/1996 | Islam | 395/182.04 |

OTHER PUBLICATIONS

Gustavson, D B, "The Scalable Coherent Interface and Related Standards Projects", *IEEE Micro,* 10–22, (Feb., 1992).

"IEEE Standard for Scalable Coherent Interface (SCI)", *IEEE Std 1596–1992,* 1–248, (Mar., 1992).

Patterson, D A, et al., "A Case For Redundant Arrays Of Inexpensive Disks (RAID)", *University of California at Berkeley, Repoort No. UCB/CSD 87/391,* (Dec. 1987).

Scott, S, "The SCX Channel: A New Supercomputer–Class System Interconnect", *HOT Interconnects III,* Abstract, pp. 1–11, (Aug. 1–11, 1995).

*Primary Examiner*—Robert W. Beausoliel, Jr.
*Assistant Examiner*—Dieu-Minh Le
*Attorney, Agent, or Firm*—Schwegman, Lundberg, Woessner & Kluth, P.A.

[57] ABSTRACT

A system for implementing RAID-5 parity generation and reconstruction. Data for an array of disk drives is placed in an I/O buffer. The RAID-5 parity engine creates parity data and stores the resulting parity data in the I/O buffer as well. The I/O buffer (both the data and the parity) is then sector-striped across a network of disk drives, such as a Fibre Channel network. The RAID-5 parity engine creates parity on multiple stripes of data upon a single activation of the engine. The RAID-5 parity engine can reconstruct a sector of data using the parity information. The RAID-5 parity engine can also check the data against its expected parity.

6 Claims, 8 Drawing Sheets

RAID-5 PARITY GENERATION AND DATA RECONSTRUCTION

STATEMENT REGARDING GOVERNMENT RIGHTS

The present invention was made with government support under MDA 972-95-3-0032, awarded by ARPA. The Government has certain rights in this invention.

FIELD OF THE INVENTION

The present invention relates to computer systems and in particular to computer storage systems.

BACKGROUND

In 1987, a system was introduced to alleviate the concerns of I/O performance and data reliability. This system, called RAID, for Redundant Array of Inexpensive Disks, consists of several methods of writing data to an array of common disks. The fifth method, called RAID-5, stripes (i.e., interleaves) sectors of data across the drives. Parity data for these sectors is calculated and saved to the disks on a rotating basis. [See, David A. Patterson, Garth Gibson, Randy H. Katz, "A Case for Redundant Arrays of Inexpensive Disks (RAID)," University of California at Berkeley, Report No. UCB/CSD 87/391, Dec. 1987]

Although RAID increases disk performance, a RAID-5 system also has its disadvantages. The primary disadvantage is the role of the processor in the management of the data to be written to disk. For each set of sectors going to disk, a corresponding sector of parity data must be calculated. What is needed is a means for automating generation of parity data in situations where there are multiple stripes in process. There is also a need for efficient methods of checking the validity of data by using its parity and of reconstructing corrupted data using the previously stored parity data.

SUMMARY OF THE INVENTION

The present invention is a system and method for generating parity and reconstructing data for RAID-5 systems. Data that is to be striped to an array of disks is taken from the I/O memory buffer. The parity for multiple stripes of data sectors is generated and is written to the I/O memory buffer with a single activation of the system by identifying to the system the sector size, the stripe width and the stripe count. The stored striped data and parity is then written to the array of disks.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and to use the invention, and it is to be understood that other embodiments may be utilized and that changes may be made without departing from the spirit and scope of the present invention. The following Detailed Description is, therefore, not to be taken in a limiting sense and the scope of the invention is defined by the appended claims. In the figures, elements having the same number perform essentially the same functions.

Figure 1:
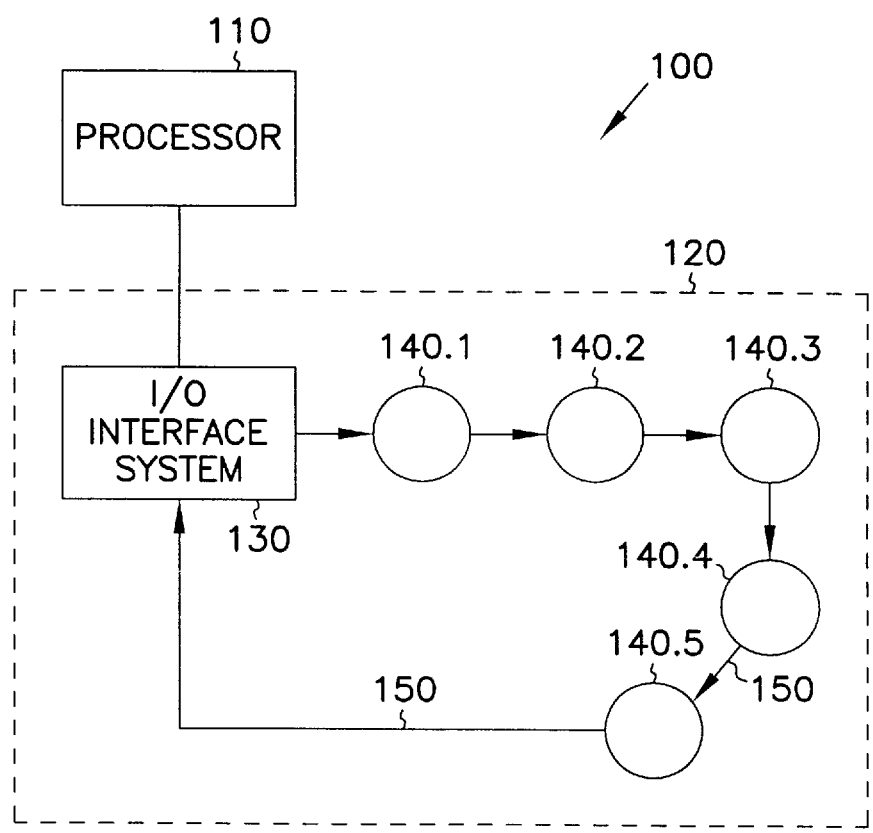
FIG. 1 is a block diagram of a computer system having one embodiment of a RAID-5 system, including an I/O interface system and an array of disk drives.

FIG. 1 is a block diagram, showing a computer system 100 having a processor 110 connected to a RAID-5 system 120. In the embodiment shown in FIG. 1, RAID-5 system 120 includes an I/O interface system 130 connected to a plurality of disk drives over a time multiplexed network by communication line 150 forming disk array 140. In one such embodiment, time multiplexed network formed by communication line 150 is a Fibre Channel network, in which the disk drives are connected in a serial loop configuration with the output of one disk drive going to the input of the next disk drive. In other embodiments, other topologies could be used, such as a bus network. Having a time multiplexed network shown in FIG. 1, allows I/O interface system 130 to connect to disk array 140 using only a single I/O channel. Such a serial RAID system is described in "Serial RAID Striping on a Single Fibre Channel Arbitrated Loop," U.S. patent application Ser. No. 08/650,632 filed herewith, the details of which are incorporated by reference. In an alternative embodiment, RAID-5 system 120 is connected to disk array 140 over separate channels in a manner known in the art.

Figure 2:
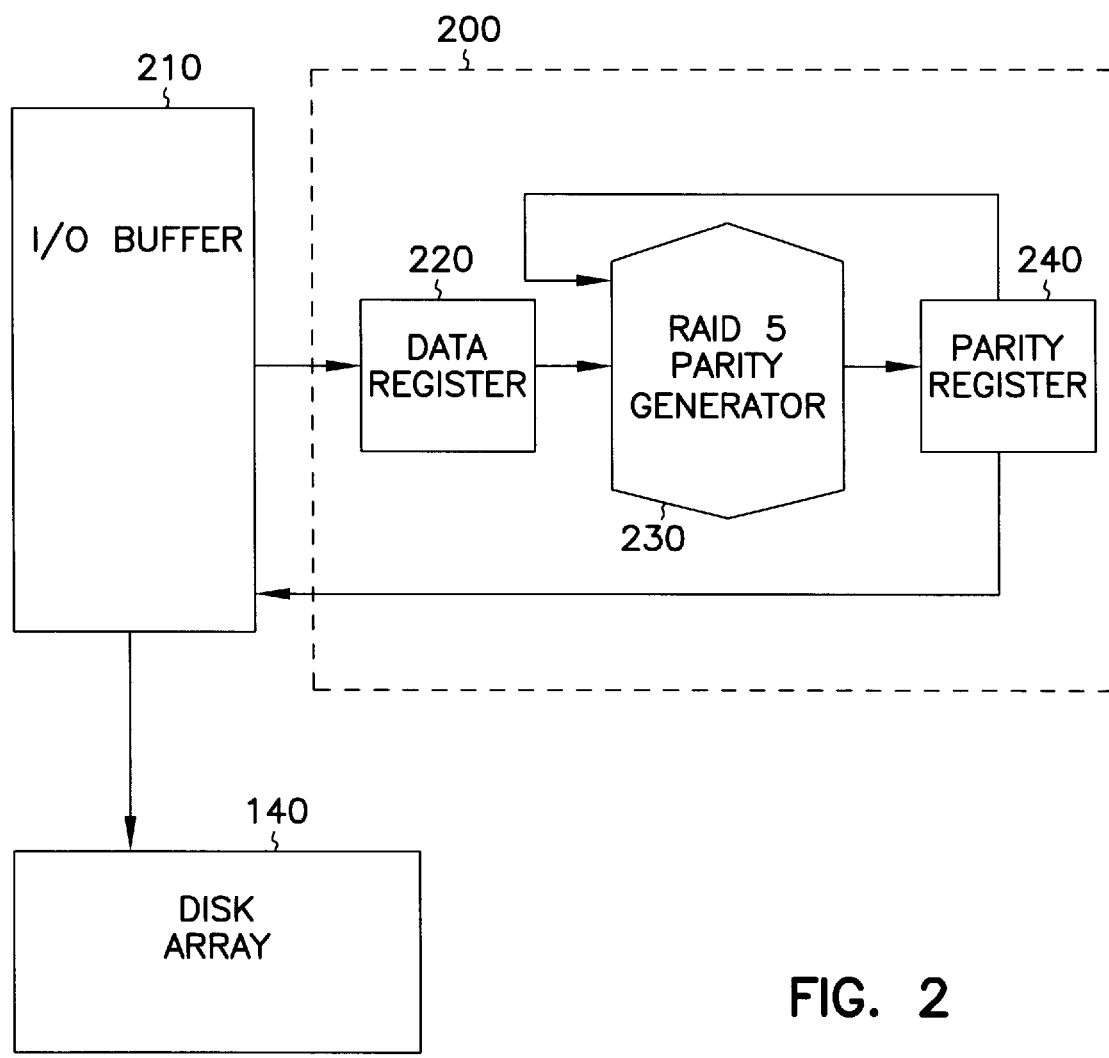
FIG. 2 is a block diagram of the RAID-5 parity engine, showing the structure of a sector-striped write of data and parity to the disk drive array.

Parity operation for RAID-5 striping can be a system bottleneck. To avoid this bottleneck, a separate parity generator can be used to offload the processor. One such parity generator is shown in FIG. 2. In FIG. 2, RAID-5 parity engine 200 generates parity and disk array 140 is used to store data. In operation, data to be written to disk array 140 is stored in I/O memory buffer 210. Parity generator 230 builds parity from data moved from I/O memory buffer 210 into data register 220. Parity generated by parity generator 230 is accumulated in parity register 240 and when parity generation is completed, the resulting parity is stored in I/O memory buffer 210. When I/O memory buffer 210 is full, its contents are transferred to disk array 140.

Figure 2A:
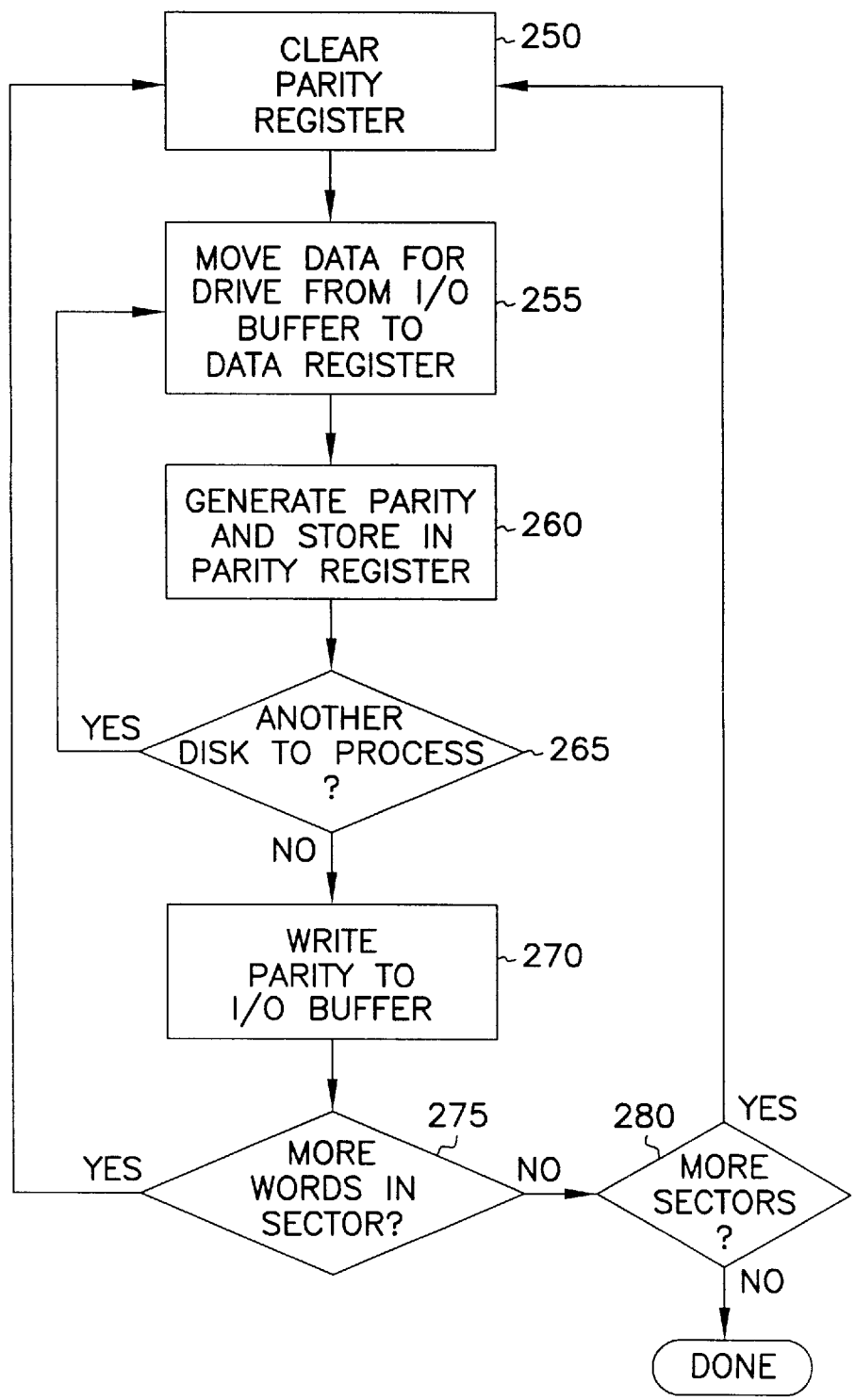
FIG. 2A is a flowchart of the steps used by the RAID-5 parity engine to sector-stripe the data and parity to the disk drive array.

The flowchart of FIG. 2A shows the steps taken by RAID-5 parity engine 200 to accomplish the sector-striping of data and parity to disk array 140. At step 250, parity register 240 is cleared. Step 265 loops through each disk drive of disk array 140, moving a word of data from I/O memory buffer 210 to data register 220 at step 255. Parity generator 230 XORs the contents of parity register 240 and data register 220, at step 260 and stores the subsequent parity back to panty register 240. When all disks have been processed, the parity is written from parity register 240 to I/O memory buffer 210 at step 270. This striping of data and parity is repeated for each word in the sector, at step 275, and then the entire process is repeated for each sector at step 280. In one embodiment of RAID-5 system 120, when I/O buffer 260 is filled with a sector of data for each disk, a channel controller will transfer the data to the correct disks.

Figure 3:
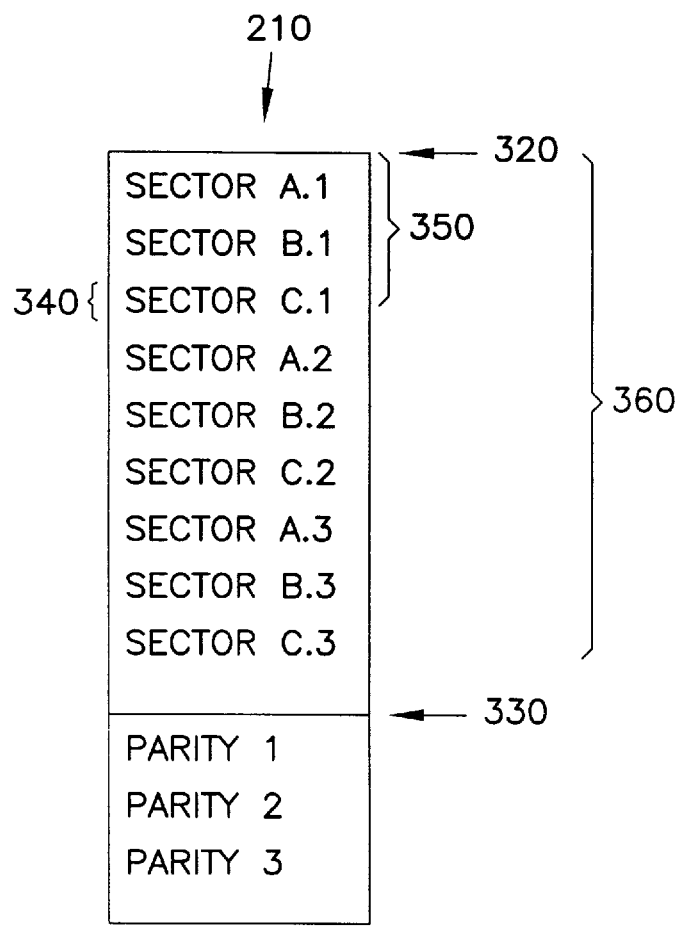
FIG. 3 is a block diagram of the Input/Output buffer memory associated with the array of disk drive devices.

FIG. 3 shows a block diagram of I/O buffer 210. Suppose that four disk drives form a virtual array of 3 disk drives; the fourth disk drive is needed to store RAID-5 parity data. In the example of FIG. 3, a stripe width 350 of 3 and a stripe count 360 of 3 is diagrammed. Other stripe widths and stripe counts could be used as well. Programming RAID-5 parity engine 200 with the stripe width 350, stripe count 360, sector size 340, base address 320 and parity address 330, will cause it, when activated, to create all the parity data for the defined stripe widths and to store the parity starting at parity address 330. This ability to generate multiple stripes of parity data upon a single activation of RAID-5 parity engine 200 removes processing responsibility from processor 110 and alleviates this potential system bottleneck.

Figure 4:
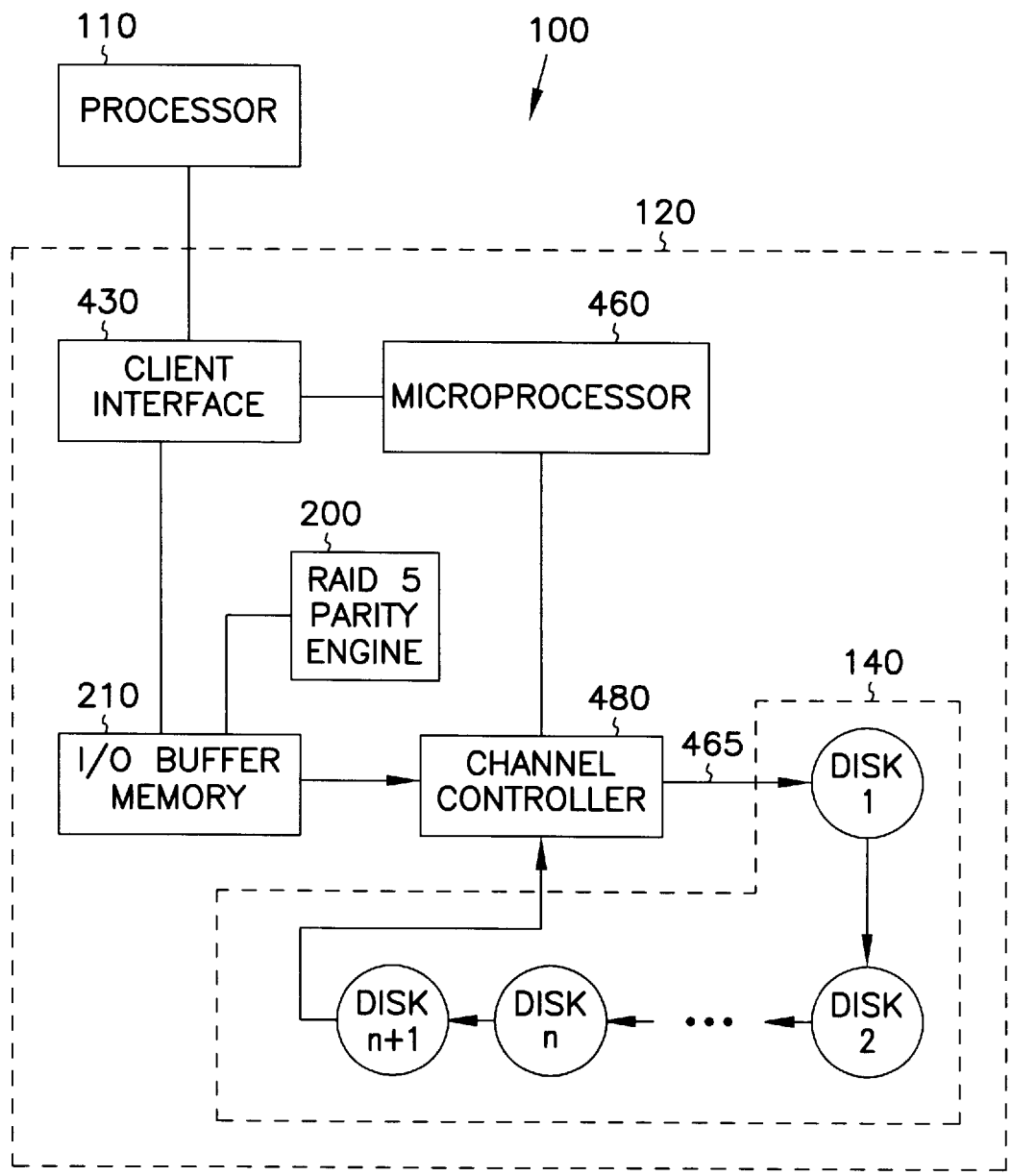
FIG. 4 is a block diagram of a computer system having a general purpose computer connected to a RAID-5 system, which includes a client interface, a RAID-5 parity engine, a channel controller, I/O buffer memory, a microprocessor and a disk array.

Once I/O buffer 210 has been loaded with the striped data (in one embodiment of the RAID-5 system, a single sector of data per disk drive is used) the I/O buffer data must be written to the disk drives. In one embodiment, each sector of data is 4 kilobytes in size. FIG. 4 shows one embodiment of the system in which a computer system 100 includes processor 110 connected to RAID-5 system 120. Processor 110 may be, for instance, a general purpose computer. RAID-5 system 120 includes client interface 430, RAID-5 parity engine 200, I/O Buffer memory 210, microprocessor 460 and channel controller 480. Channel controller 480 is connected over a serial network 465 to disk drive array 140. Microprocessor 460 is connected to client interface 430 and channel controller 480 in order to control transfer of data between processor 110 and client interface 430 and between I/O buffer memory 210 and disk drive array 140. Data from processor 110 is saved to disk array 140. In the embodiment shown in FIG. 4, client interface 430 transfers the data received from processor 110 to I/O buffer 210. RAID-5 parity engine 120 generates parity and loads the resulting parity data into I/O buffer 210.

In one embodiment, the data is accumulated in I/O buffer memory 210 until one sector for each data disk drive and one sector of parity are collected. Then a sector of data is transferred by channel controller 480 to each of the disk drives in disk array 140. Data is sent using a SCSI-2-like protocol embedding an address corresponding to a particular disk drive with the data to be transferred to that drive. In other embodiments, multiple sectors per disk could be accumulated in I/O buffer 210 before transfer to disk array 140.

Figure 5:
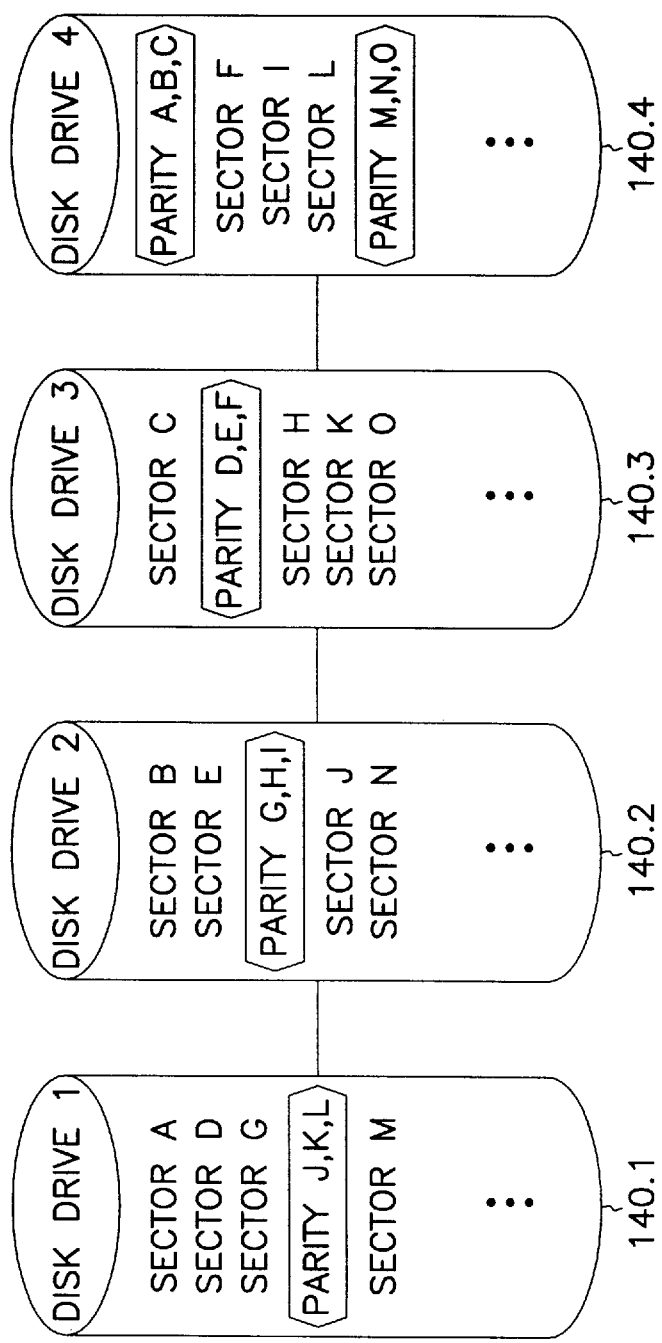
FIG. 5 is a block diagram of an array of disk drives showing how parity is striped along with sectors of data across the array of disks.

Unlike a RAID-3 system, in which one disk drive is dedicated to parity data, in a RAID-5 system parity data is striped across disks in disk array 140. FIG. 5 is a block diagram showing how one implementation of RAID-5 system 120 stripes the sectors of data and parity from I/O buffer 210 across the array of disk drives 140. In the embodiment in FIG. 5, computer system 100 includes a "3+1" disk array, meaning that 4 disk drives 140.1, 140.2, 140.3 and 140.4 store the data using three drives and one drive for associated parity data. In the first parity generation, I/O buffer 210 stores data sectors A, B, and C. Sector A is stored to disk 1 140.1, sector B to disk 2 140.2 and sector C to disk 3 140.3. The resulting parity is stored to disk 4 140.4. In the next parity generation, the data is sector-striped so that sector D is stored to disk 1 140.1, sector E is stored to disk 2 140.2, parity is stored to disk 3 140.3 and sector F is stored to disk 4 140.4. The shifting of parity among the drives continues in subsequent sector groups.

Data reconstruction is the second function of RAID-5 system 120. In one embodiment, each disk controller detects faults and reports them to RAID-5 parity engine 120. Since RAID-5 parity engine 120 then knows the drive whose data is corrupted, the previously calculated parity can be used to reconstruct the data. This process increases data reliability because by reconstructing the data, disks array 140 can suffer corruption again from another of its disks and the system 120 will again be able to reconstruct the data at that time.

Figure 6:
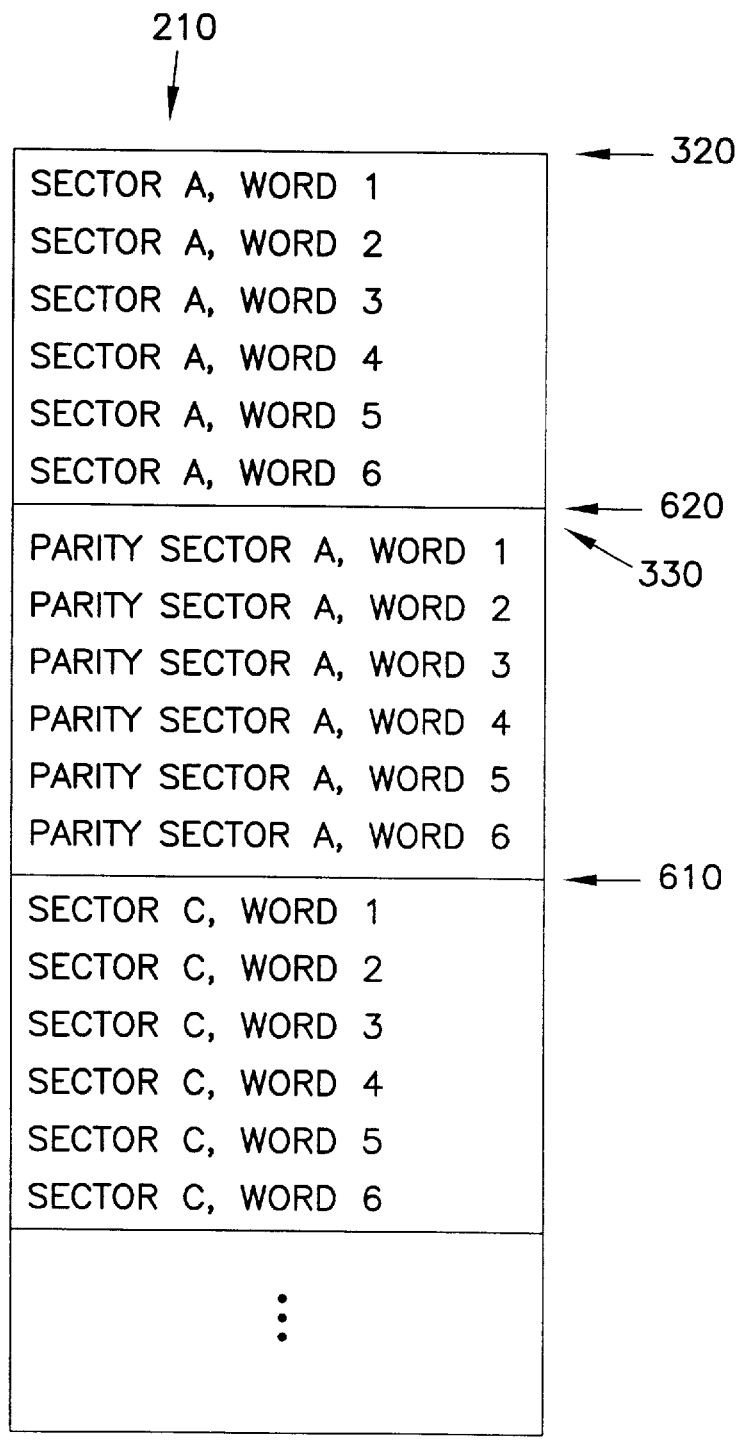
FIG. 6 is a block diagram of the Input/Output buffer memory associated with the array of disk drive devices loaded with parity data in order to reconstruct corrupted striped data.

FIG. 6 is a block diagram of I/O buffer 210 with data corruption from second disk drive 140.2. Sector A has been loaded from first disk drive 140.1 and stored in I/O buffer 210 at base address 320. Sector B from disk drive 2 140.2 is corrupted. Sector C from disk drive 3 140.3 is stored in I/O buffer 210 and the parity data from disk 4 is stored in I/O buffer 210 at the memory location where the corrupted data needs to be repaired (in FIG. 6, at base address plus 1 sector 620). RAID-5 parity engine 120 will reconstruct the data by generating parity based on the data from the first and third drives and the previously calculated parity for drives one through three. The newly generated parity, which is the reconstructed data for drive 2, is moved from parity register 240 to I/O buffer 210 at base address plus 1 sector 620, the proper location for the data for disk drive 2 140.2. Doing so will overwrite the parity sector in I/O buffer 210.

Figure 7:
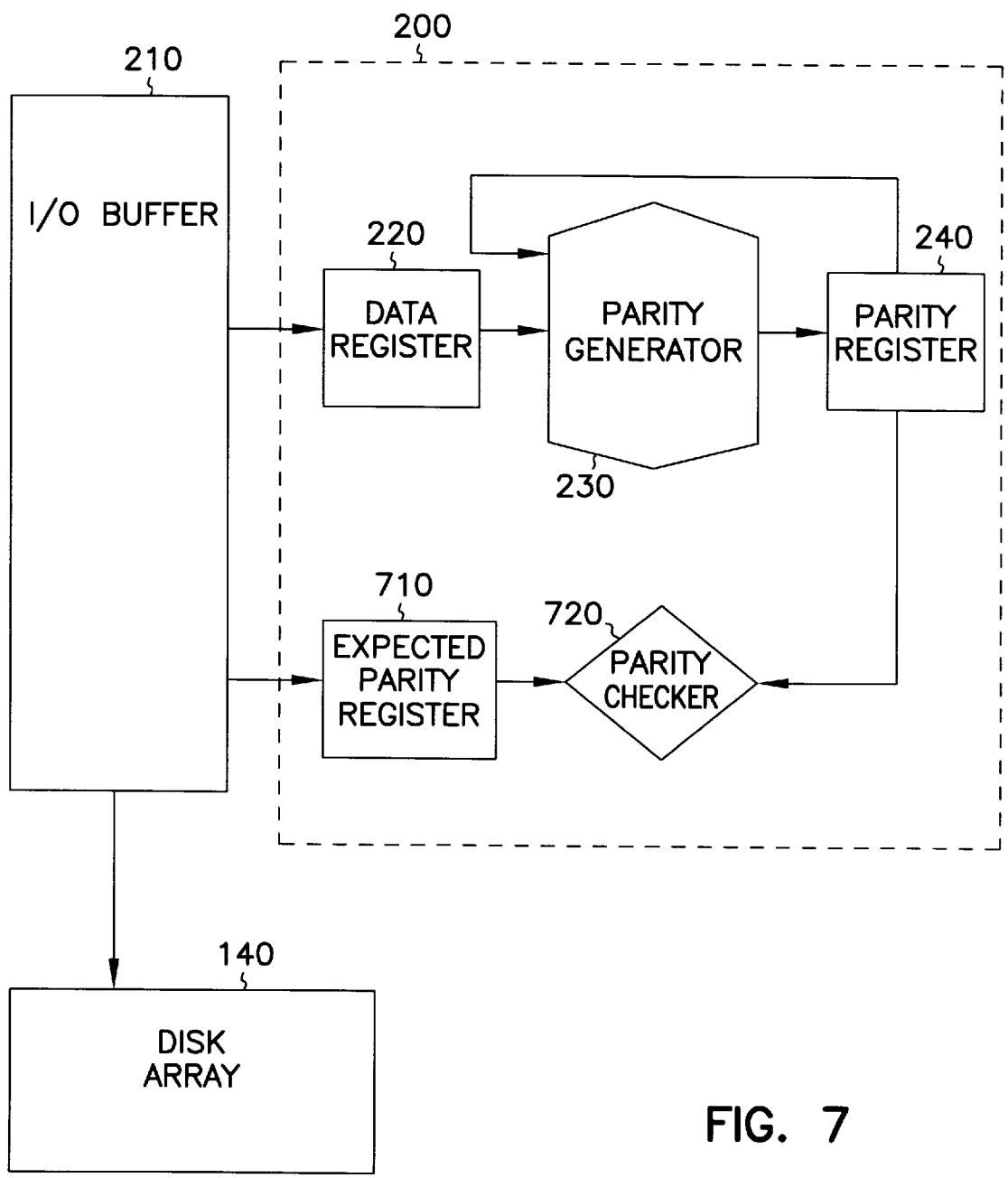
FIG. 7 is a block diagram of the RAID-5 parity engine, showing engine to checking the validity of data by comparing generated parity against an expected parity.

FIG. 7 is a block diagram illustrating a third function of RAID-5 parity engine 200. In addition to parity generation and data reconstruction, RAID-5 parity engine 200 also handles parity checking. In checking mode, parity is stored from I/O buffer 210 in expected-parity register 710. Parity checker 720 compares the generated parity from parity register 240 against data in expected-parity register 710. If these registers disagree, an error is reported indicating that the data is corrupted.

In one embodiment, the following registers are implemented for processor 110 to program RAID-5 parity engine 120:

| RAID-5 Parity Generator Register | Function Description |
| --- | --- |
| RPG:0 | Clear busy/done |
| RPG:1 | Set starting I/O buffer base address 320 |
| RPG:2 | Set starting I/O buffer parity address 330 |
| RPG:3 | Set sector size and stripe width |
| RPG:4 | Set stripe count and control and start transaction |
| RPG:11 | Read current I/O buffer base address |
| RPG:12 | Read current I/O buffer parity address |
| RPG:14 | Read error register |

RAID systems offer a means for improved disk performance and data reliability. RAID-5 parity engine 120 provides added value to a redundant array of inexpensive disks by managing the generation of parity for large segments of data with minimal involvement by processor 110. RAID-5 parity engine 120 also doubles as a means for flagging or reconstructing corrupted data from disk array 140. Other embodiments of the present invention are possible without departing from the scope and spirit of the present invention.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

We claim:

1. In a computer system having a plurality of disk drives connected over a time multiplexed network, a method for storing data, comprising the steps of:

providing a channel interface;

connecting the channel interface to an I/O buffer memory and to the plurality of disk drives over the time multiplexed network;

calculating a sector size;

calculating a stripe width;

calculating a stripe count;

reading stored striped data sectors from the I/O buffer memory, wherein the size of each striped data sector is a function of said sector size, said stripe width and said stripe count;

generating parity sectors from the striped data sectors read from the I/O buffer memory, wherein the size of each parity sector is a function of said sector size, said stripe width and said stripe count;

storing the parity sectors to the I/O buffer memory; and writing the stored striped data sectors and parity sectors from the I/O buffer memory through the channel interface to the plurality of disk drives.

2. The method for storing data as recited in claim 1, wherein the step of generating parity data comprises:

generating parity for the identified stripe width and sector size; and repeating the generation of parity for the identified stripe count.

3. The method for storing data as recited in claim 1, wherein the step of generating parity data further comprises the steps of:

generating initial parity from striped data;

generating validity parity to compare stored parity with anticipated parity;

generating reconstruction parity to repair corrupted data; and storing the reconstructed parity sectors to the I/O buffer memory; and wherein the channel controller transfers reconstructed parity sectors in the I/O buffer memory to the plurality of disk drive devices.

4. A RAID-5 system, comprising:

an I/O interface system; and a plurality of disk drive devices connected over a time multiplexed network to said I/O interface system;

wherein, the I/O interface system comprises;

a channel interface;

an I/O buffer memory holding striped data sectors, wherein the size of each striped data sector is a function of said sector size, said stripe width and said stripe count;

a RAID-5 parity generator connected to the I/O buffer memory, wherein the RAID-5 parity generator reads striped data sectors stored in the I/O buffer memory calculates parity sectors as a function of the data sectors read from the I/O buffer memory and saves said parity sectors calculated by said parity generator to the I/O buffer memory, wherein the size of each parity sector is a function of said sector size, said stripe width and said stripe count; and a channel controller which transfers striped data sectors and parity sectors stored in the I/O buffer memory to the plurality of disk drive devices.

5. The RAID-5 system, as recited in claim 4, wherein the I/O interface system further comprises, a sector size indicator;

a stripe width indicator;

a stripe count indicator; and wherein the RAID-5 parity generator calculates parity sectors using the sector size indicator and stripe width indicator and repeats the calculating of parity sectors based on the stripe count indicator.

6. The RAID-5 system, as recited in claim 4, wherein the RAID-5 parity generator also generates validity parity to check stored parity and reconstructs parity sectors and stores reconstructed parity sectors to the I/O buffer memory; and wherein the channel controller transfers reconstructed parity sectors in the I/O buffer memory to the plurality of disk drive devices.

* * * * *